D. FRANCE.
Harrow-Teeth.

No. 134,137. Patented Dec. 24, 1872.

Witnesses
James B. Beals.
Henry W. Cory.

Inventor.
David France, by
Chas. F. Sleeper, Atty

UNITED STATES PATENT OFFICE.

DAVID FRANCE, OF LAKEVILLE, MINNESOTA.

IMPROVEMENT IN HARROW-TEETH.

Specification forming part of Letters Patent No. 134,137, dated December 24, 1872.

*To all whom it may concern:*

Be it known that I, DAVID FRANCE, of Lakeville, in the county of Dakota and State of Minnesota, have invented certain Improvements in Harrow-Teeth, of which the following is a specification:

The object aimed at in my invention is to improve the teeth used in harrows so as to give more perfect action in smoothing a piece of ground or covering seed, which through my invention I accomplish, turning up the soil to a greater depth and more evenly than can be done by any other harrow-tooth known to me. The draft in my drag is not greater than that of the one in common use; and in wet land or spring harrowing I consider that one operation with my improved teeth is equal to six with any other, and under any circumstances one harrowing with mine will equal four done by any other harrow of which I have any knowledge. It is cleaned as easily as a common harrow, and from its form is constantly scoured and kept bright and smooth by its contact with the earth, (which operates upon it as upon a plow,) and thus it is drawn easily through the ground. The same number of teeth can be used as in the ordinary harrow, and it will turn up and clean the soil to the depth of from three to four inches, which, obviously, is a great improvement upon the machines in common use.

I prefer to make all of my tooth of wrought-iron except the front part of that portion which comes below the frame, and that, including the "palm," should be of hardened steel, in order to give greater durability to that part of the tooth most liable to friction, while at the same time the combination of the iron and steel insures hardness, toughness, and elasticity. Should any tooth get broken, however, a new one can be inserted as readily as in a common harrow.

Figure 1:
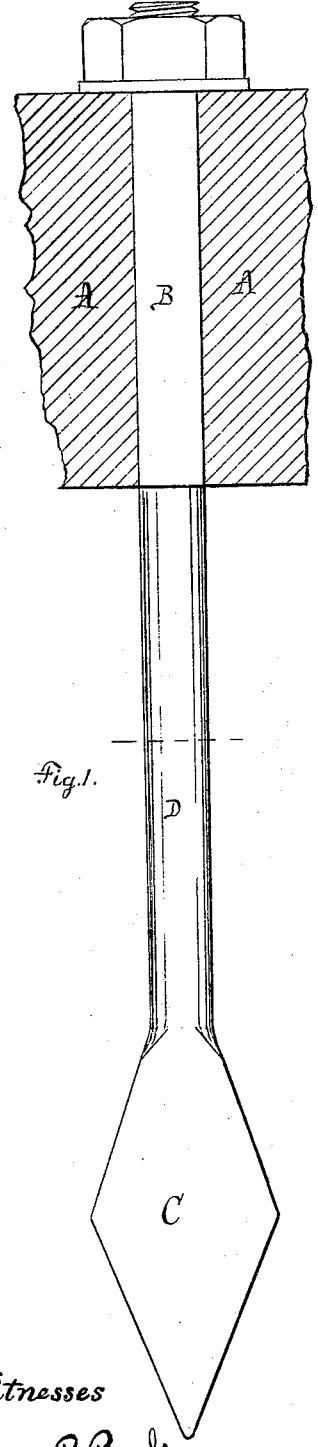
Figure 2:
Figure 3:
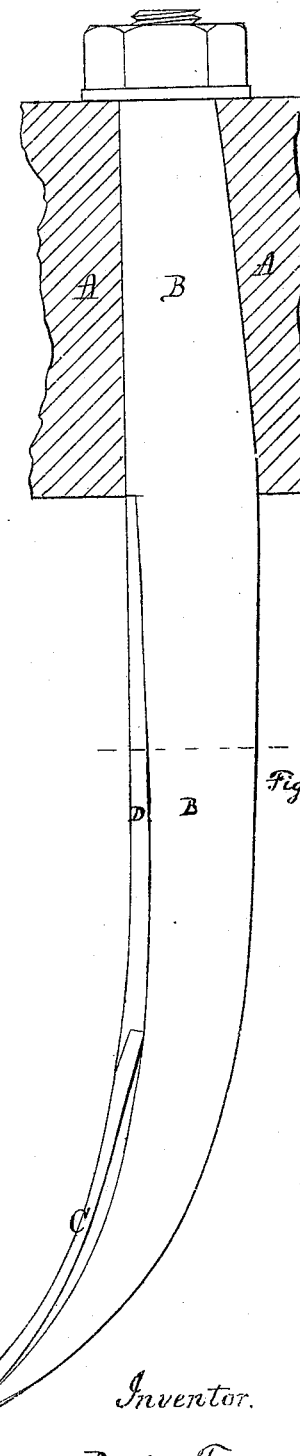

In the drawing, Figure 1 shows a front view, Fig. 2 a section, and Fig. 3 a side view, of my improved tooth.

A shows the frame; B, the iron portion of the tooth; C, the palm; and D, the steel part.

I claim as my invention—

As a new article of manufacture, a harrow-tooth made with a share, C, and front D of steel, and a main body, B, of iron, of the form and configuration substantially as described, and for the purpose specified.

DAVID FRANCE.

Witnesses:
WM. HODGSON,
ALIDON AMIDON.